July 17, 1962 W. H. NORTON 3,045,098
ELECTRIC HEATER
Filed Nov. 19, 1959 2 Sheets-Sheet 1
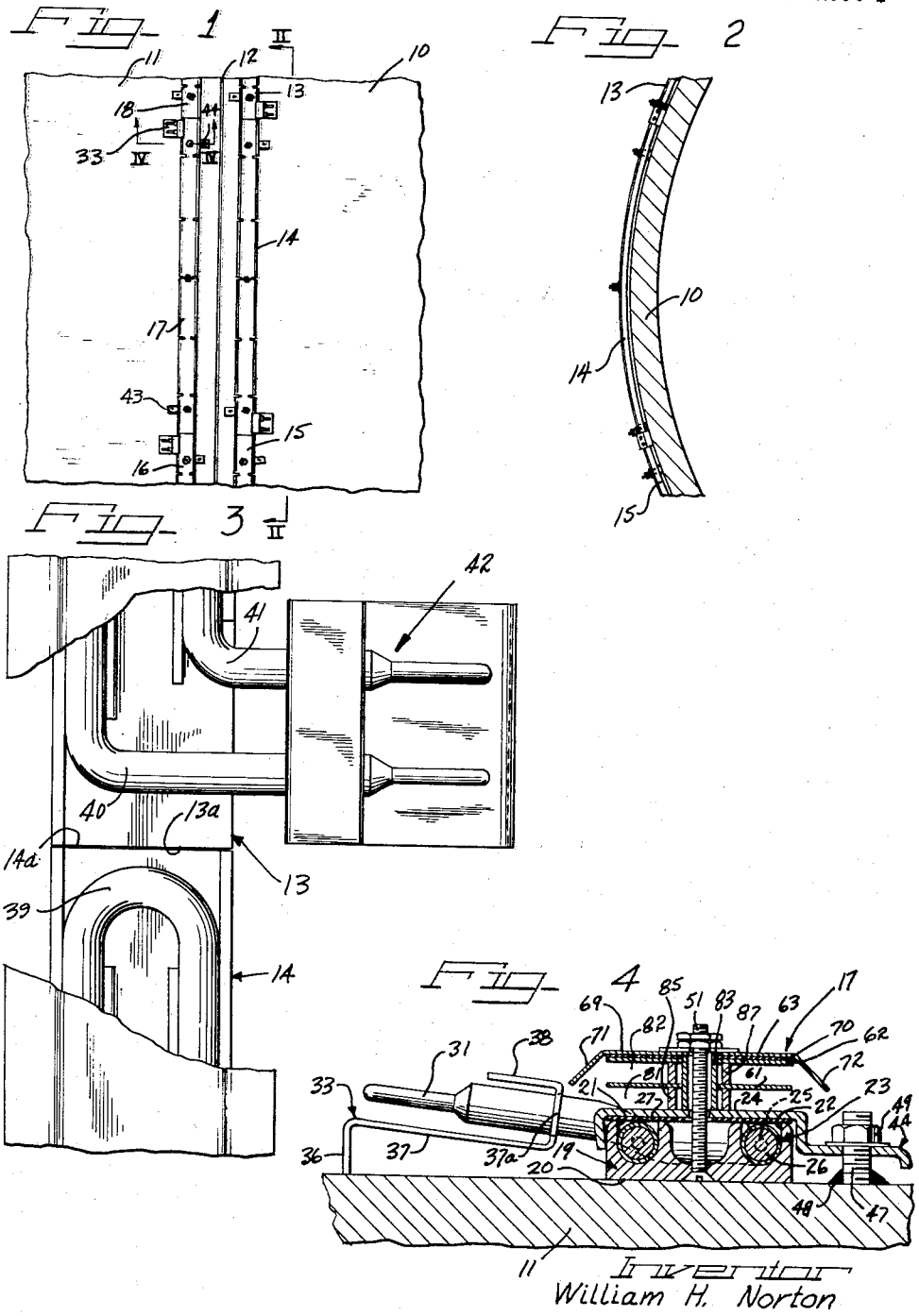
Inventor
William H. Norton

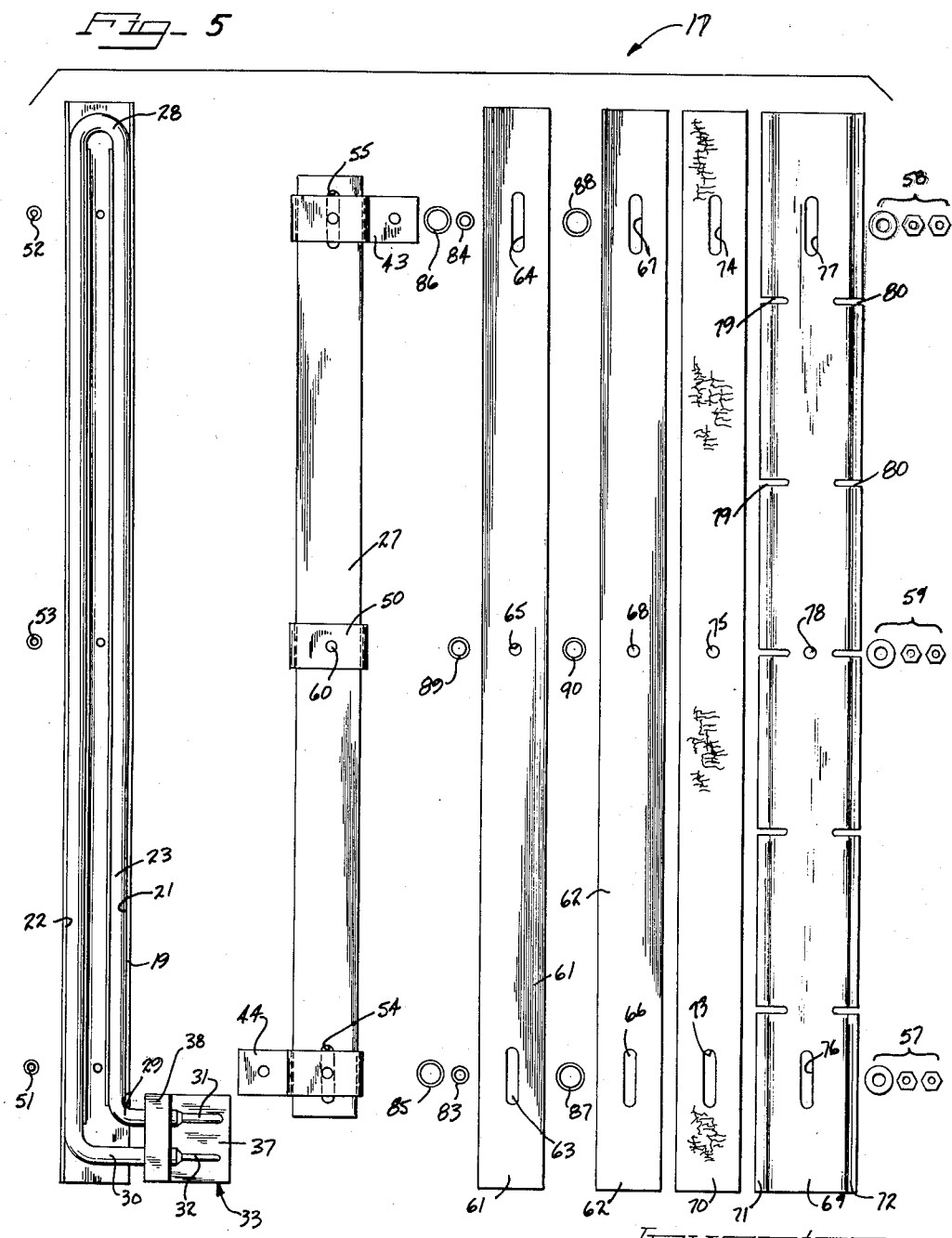

United States Patent Office 3,045,098
Patented July 17, 1962

3,045,098
ELECTRIC HEATER
William H. Norton, Mundelein, Ill., assignor to Thermel Incorporated, Franklin Park, Ill., a corporation of Delaware
Filed Nov. 19, 1959, Ser. No. 854,084
13 Claims. (Cl. 219—19)

This invention relates to a heating device and more particularly to an improved electrical heating unit for heat conditioning metal plates for welding.

Heavy metal plates which are joined by welding frequently must be preheated to avoid cracking of the metal. In installations such as submarine and ship hulls thick steel plates must be joined by welding, and must be preheated and/or post heated to avoid cracking. The armor plated hulls of atomic submarines, for example, may be formed of relatively thick molybdenum steel plates which require preheating for welding to prevent cracking. Preheating with a contact type of heater poses problems in that some surfaces, for example, of a submarine hull, are curved also, preheating and welding normally must be done out of doors.

The present invention contemplates the provision of elongated heater units which are attached in aligned rows to the surfaces of metal plates on each side of a seam between the plates for heating the metal, and which conform to surfaces of different curvature or to flat surfaces. The temperature to which the metal is preheated is a function of the type of steel used and the thickness of the steel plate. For example, steels having a molybdenum content may be used and may range in thickness from two to six inches and be preheated to temperatures ranging from 100° to 400° F. The heating elements are attached to the plates to be welded and kept in place during the welding operation, and in some instances are retained for post heating after the welding operation. It will be appreciated that efficiency is of paramount importance and in industrial applications such as in shipyard welding wherein large numbers of heating units are continually used efficiency increases can result in savings of many thousands of dollars. Efficiency in heat transfer can also obtain a unit which is more effective and cooler in operation requiring a smaller unit and one safer for operating personnel and equipment. It is also important that the heating unit be usable in inclement weather and can continue operation preventing cracking of the metal in the event rain begins during welding operation. The unit should also not be damaged by dropping in the water.

An object of the invention is to provide a heating unit of the above type having increased efficiency and capable of uniformly heating metal plates on both sides of a seam to be welded.

Another object of the invention is to provide an improved electrical heating unit of the type described which can be used in the rain and is not damaged if accidentally dropped in the water.

Another object of the invention is to provide an improved heating unit for heat conditioning plates for welding which is lower and flatter than the units heretofore available, and wherein the parts are easily replaceable to reduce the maintenance costs.

Another object of the invention is to provide an improved heating unit for preheating plates for welding which is especially well adapted to heating curved surfaces and wherein the entire unit conforms and is in good heat transfer contact with the flat or curved surface being heated for improved heat transfer properties and increased efficiency.

Another object of the invention is to provide a heating unit of the type described with improved operational and safety features, having an outer cover which is maintained at a low temperature, having improved means for connection to a surface to be heated, and having improved electrical connecting means.

Other objects and advantages will become more apparent with the teaching of the principles of the invention in connection with the disclosure of the preferred embodiment thereof in the specification, claims and drawings, in which:

FIGURE 1 is a plan view illustrating heating units embodying the principles of the present invention in operating position for heating plates to be welded;

FIGURE 2 is a section view taken substantially along line II—II of FIGURE 1;

FIGURE 3 is a fragmentary plan view, with parts broken away, illustrating the ends of two adjacent heating units;

FIGURE 4 is a vertical sectional view taken substantially along IV—IV of FIGURE 1; and FIGURE 5 is an exploded view illustrating the individual parts of the heating unit before assembly.

As shown on the drawings:

Heavy curved plates 10 and 11 to be welded at a seam 12 are illustrated being preheated by heating units 13, 14 and 15 attached to the plate 10, and 16, 17 and 18 attached to the plate 11. It will be understood that the plates may be curved or may be flat, and FIGURE 2 illustrates the heater applied to a curved surface. For this purpose the heating units are shaped or bent to conform to the arcuate surface of the plate to be heated and to its exact curvature and attached thereto for good heat transfer. A feature of the present invention is the ability of the present heating unit to be easily shaped to conform to the curvature of the surface being heated for improved surface contact without adversely affecting the function of any of the elements of the heating unit and maintaining good heat transfer contact with the plate. The heating unit is also well adapted to being bent to different curvatures or flattened for reuse without affecting its efficient performance.

As illustrated in FIGURES 4 and 5, the heating unit includes an elongated heater shoe 19 preferably formed of aluminum which has good heat transfer properties and which is a bendable material. The shoe can be reused on plates of the same curvature or can easily be straightened for reuse on flat surfaces or plates of a different curvature. The shoe has a flat planar lower heat transfer surface 20 which engages the surface of the plate 11 to be welded. The shoe has upstanding ribs which are spaced to provide grooves 21 and 22 for holding a tubular heating element 23.

The heating element is formed to a general U-shape, as illustrated in FIGURE 5 and is conventionally formed of a hollow tube 24 with an electrical resistance element 25 therein embedded in an insulating material 26 within the tube.

The tube is held in the grooves 21 and 22 by a retainer plate 27 which will later be described in greater detail.

The tube 23 is doubled into a general U-shape with a connecting double end 28, FIGURE 5, and with the other ends 29 and 30 turned at right angles to the longitudinal portions of the tube and attached to a connector support 33. The connector support insulatingly supports connector pins 31 and 32 which electrically connect to the resistance wire 25 within the tube. The pins 31 and 32 are sealed in a waterproof manner as they enter the tube 23 so that an electrical connecting plug of known design can remain attached for outdoor operation. Another connector support is illustrated at 42 in FIGURE 3 although each of the heating units is identical in construction. The connector support 33 supports the connector pins 31 and 32 and is illustrated as having a flat lower body portion 37 turned upwardly at 37a and rigidly receiving the ends of the tube 23. A protecting portion 38 extends over the tube ends. The connector support 35 is generally Z-shaped and has a downwardly extending leg portion 36 which extends substantially to the plane of the heat transfer surface 20 of the shoe 19 and thus rests on the surface of the plate 11 being heated. The connector support is shaped so that the terminal pins 31 and 32 extend outwardly and upwardly at an angle to the surface to which the heating unit is attached and the leg portion 36 will support the connector against forces applied to the connector, for example, permitting a man to step on the connector without damaging it. The support for the connector also permits cables or other materials to be laid over the connector without tipping the shoe 19 to cause it to lose positive surface-to-surface engagement with the plate being heated.

The tubular heating elements are attached to the shoes so that when a plurality of shoes is connected to a plate in tandem arrangement, heat will be transmitted uniformly to the plates. As illustrated in FIGURE 3, the U-shaped end 39 of the heating element for the heating unit 14 is spaced from the end 14a of the unit a distance so that the heat emitted from the cross portion 39 will heat the end area of the shoe. Similarly, the ends 40 and 41 of the tubular heating element for the heating unit 13 are turned laterally from their shoe a distance spaced from the end 13a so that the portion which extends laterally will heat the end area of the shoe. If the body portion of the heating element would run all the way to the end of the shoe a concentration of heat would occur at that location. The instant arrangement permits the use of a tube with a uniformly distributed heating element therein and obtains uniform temperature throughout the length of the shoe so that the plate is uniformly heated by a plurality of heating units in tandem.

When very heavy plates are employed or when high temperatures are desired two rows of heating elements on each side of the seam may be employed.

The heating units are mounted on a plate to be heated by attaching brackets, as illustrated at 43 and 44, FIGURES 1, 4 and 5. The attaching brackets extend across the top of the shoe 19 above the retainer plate 27. The brackets extend in opposite directions for improved holding of the shoe and to avoid interference with the electrical connectors. Prior to preheating, studs such as 47, FIGURE 4, are attached by welding 48 to the surface of the plate 11 and the brackets are held to the studs by nuts 49 threaded on the studs. The brackets 43 and 44 hold the retainer plate 27 down to hold the tubular heating element 23 in its grooves 21 and 22 and a clip 50 holds the center of the retainer plate in place. The heating unit parts are held assembled by end bolts 51 and 52 extending upwardly through the ends of the shoe 19 and by a center bolt 53 extending upwardly through the center of the shoe. The bolts hold the parts of the unit together and the parts are yieldably connected to the end bolts in a longitudinal direction so as to freely conform to the arcuate shape of the shoe when it is bent to the shape of a plate to be welded. This is accomplished by passing the end bolts 51 and 52 through elongated longitudinally extending slots in the parts, such as slots 54 and 55 in the ends of the retainer plate. At their upper ends the bolts receive a washer, a tightening nut and a locking nut as indicated at 57 and 58 for the bolts 51 and 52, and at 59 for the bolt 53. The central openings, such as an opening 60 through the retainer plate 27 are circular to retain the location of the parts with respect to the center of the shoe and the bolt 53 acts as a locater.

Spaced above the retainer plate are reflector plates 61 and 62, FIGURES 4 and 5. The reflector plates are preferably formed of a material having a low emissivity characteristic such as an aluminum alloy. Material of the nature known by the trade name "Alzak" is advantageously used. I have found that while other numbers of reflectors may be employed, the use of two reflectors with an air gap between the reflectors, and an air gap between the lowermost reflector and the retainer plate achieves peak performance and the addition of other reflectors does not proportionately increase the efficiency of the unit. With the arrangement illustrated and described, small air gaps may be maintained reducing the overall height of the unit making it more expedious for use in that the unit does not interfere with equipment that must be moved over the surface and does not interfere with welding equipment when the adjacent plates are joined.

The reflector plates are also yieldingly connected in the assembly to permit bending, and have arcuate slots 63 and 64, and 66 and 67, for receiving the bolts 51 and 52. Round center holes 65 and 68 receive the center bolt 53.

Positioned on top of the uppermost reflector 62 is a cover plate 69 preferably formed of stainless steel and an asbestos insulating strip 70 is positioned between the cover plate and reflector plate 62. The cover plate has reflector edges 71 and 72 turned downwardly with the edges extending outwardly beyond the reflectors 61 and 62, as illustrated in FIGURE 4. The asbestos strip is provided with elongated slots 73 and 74 at its ends and a circular opening 75 at its center, and the cover plate has elongated slots 76 and 77 at its ends with a circular opening 78 at its center.

The cover plate has laterally inwardly extending slots 79 and 80 spaced along the down turned reflector edges 71 and 72 so that the cover plate can curve arcuately with the bending of the shoe 19.

As shown in FIGURES 4 and 5, extending up through the slots in the reflector plates 61 and 62 are sleeves 83 and 84 which permit the nuts 57 and 58 to be tightened to urge the brackets 43 and 44 down tightly against the retainer plate thereby holding the tubular heating element 23 firmly in its grooves in the shoe. Surrounding the sleeves are spacer collars 85 and 86 maintaining the air gap 81 between the lower reflector plate 61 and the shoe. Spacer collars 87 and 88 are mounted between the reflector plates 61 and 62 to maintain the air gap 82 between the reflector plates. Similar collars are carried on the central bolt 53 with a spacer collar 89 positioned beneath the lower reflector plate 61, and a spacer collar 90 positioned between the reflector plates 61 and 62.

In operation the assembled heating unit in the form illustrated in FIGURES 1, 2 and 4 is bent to the curvature of a plate to be heated, or is straightened for a flat plate. A plurality of such heating units are secured in rows on each side of the seam between plates to be welded, by studs such as 47, FIGURE 4, which are temporarily welded to the surface of the plates. The shoe has the same curvature as the flat or curved plate, and the reflector plates and cover plate take a shape following the shape of the shoe while retaining their relative spacing without loss of function. Electrical plugs are attached to the connectors leading away from the heating units and the cables can be supported on the surfaces of the plates and will not accidentally cross the seam to be welded. The cover plate will remain sufficiently cool so as to not injure personnel and not damage rubber goods such as cable insulation.

Thus it will be seen that I have provided an improved heating unit which meets the objectives and advantages hereinabove set forth and which is especially adapted to heat conditioning plates to be welded. The unit is easily assembled and disassembled permitting replacement of any of the parts which are damaged or become worn out. For example, the tubular heating element can readily be replaced when it burns out thus affording an extremely long operating life for the unit. The reflectors and cover plate extend for the full length of the shoe and when a plurality of units are connected in tandem they operate as a single unit applying a uniform heat to a plate.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A heater for conditioning metal plates for welding comprising a heater shoe formed of a heat conducting material and having a bottom heating surface, an electrical heating element attached to said shoe and in heat transfer relation therewith, an electrical connector positioned at one side of said shoe extending angularly away from the plane of the bottom of the shoe and connected to said heating element, a connector support member having a first angular portion beneath the connector and having a leg extending downwardly to substantially the plane of the bottom of the shoe for supporting the connector against forces directed toward the shoe, and a plurality of spaced reflector plates above said shoe with air gaps between the shoe and plates and between each of the plates.

2. A heater for conditioning metal plates for welding comprising an elongated heater shoe formed of a bendable material and having a planar bottom heating surface, an electrical heating element attached to said shoe in heat transfer relation therewith, spaced deflector plates mounted above the shoe, connecting members secured to the shoe and projecting upwardly therefrom through said reflector plates, spacing means for supporting the reflector plates with air gaps therebetween, and means defining elongated slots receiving said connecting members and extending longitudinally for accommodating sliding of the connecting member in the slots for bending of the shoe to conform to a curved surface of a plate to be welded.

3. A heater for conditioning metal plates for welding comprising an elongated heater shoe formed of a heat conducting material with a heat transfer bottom surface, a plurality of reflector plates supported above the shoe in spaced relationship thereto with air gaps therebetween, and a doubled tubular electrical heating element extending along the shoe with longitudinal portions and end portions, one end portion turned at right angles to the longitudinal portions and extending laterally off the shoe a distance spaced from one end of the shoe so that said end portion provides heat to the end of the shoe for obtaining a uniform temperature along the shoe, the second end portion of said heating element joining said longitudinal portions and spaced from the other end of the shoe a distance so that said second end transmits heat to the other end of the shoe providing a uniform temperature along the shoe so that a plurality of shoes may be mounted in tandem relationship on the surface of a metal plate to be heated for welding.

4. A heater for conditioning metal plates for welding comprising an elongated longitudinally bendable heater shoe formed of a heat conducting material and having a bottom heating surface, an electrical heating element attached to said shoe in heat transfer relation therewith, a plurality of spaced flat planar reflector plates mounted above the shoe and bendable with the shoe with air gaps between the plates and the shoe, and a cover positioned above said reflector plates having longitudinal edges turned downwardly toward the shoe.

5. A heater for conditioning metal plates for welding comprising a heater shoe formed of a bendable material and having a planar bottom heating surface, an electrical heating element attached to said shoe in heat transfer relation therewith, a plurality of spaced reflector plates mounted above the shoe with air gaps between the plates and the shoe, a cover plate mounted above the reflector plates and having edge portions projecting outwardly beyond the edges of the reflector plates, and means defining a plurality of slots in said edge portions for accommodating bending of the shoe with the cover conforming to the shoe contour.

6. A heater for conditioning metal plates for welding comprising an elongated longitudinally bendable heater shoe formed of a heat conducting material and having a bottom heat transfer surface, an electrical heating element mounted on the shoe, a plurality of flat planar heat reflector plates mounted spaced above said shoe and bendable therewith and spaced from each other with air gaps therebetween, a cover plate mounted above the uppermost heat reflector plate, and a layer of insulating material beneath said cover plate.

7. A heater for conditioning metal plates for welding comprising a heater shoe formed of metal having a conductive surface-engaging heat transfer bottom surface bendable in a vertical longitudinal plane, means defining an open elongated slot in the upper surface of said shoe, a tubular heating element mounting in said slot, a retainer plate connected to said shoe and clamping said element in said slot, a plurality of spaced flat planar reflector plates mounted on said shoe above said retainer plate parallel to each other and secured to the shoe to bend therewith with air gaps therebetween, and a cover plate mounted on the shoe and spaced above said reflector plates.

8. A heater for conditioning metal plates for welding comprising an elongated heating shoe formed of a bendable material having a planar bottom heating surface, an electrical heating element attached to said shoe in heat transfer relation therewith, a plurality of spaced reflector plates positioned above the shoe for reflecting the radiant heat back to the shoe, and connecting members between the shoe and said plates supporting the plates above the shoe and yieldably connected to the plates yielding with respect to the plates in a longitudinal direction with bending of the shoe to conform to a curved surface to be heated for welding.

9. A heater for conditioning metal plates for welding comprising a heater shoe formed of a bendable material with a lower heat transfer surface, an electrical heating element mounted on said shoe in heat transfer relation therewith, a plurality of planar spaced reflector plates positioned above said shoe, a cover plate positioned above said reflector plates, end supports supporting said reflector plates and said cover plate in spaced relationship on said shoe with air spaces therebetween, and intermediate support means connected between said shoe and said reflector plates and cover plate between the end supports so that the spacing will remain constant and the reflector plates and cover plates will bend with the shoe and conform to the contour of the shoe.

10. A heater for conditioning metal plates for welding comprising an elongated heater shoe formed of a bendable material having a planar bottom heat transfer surface, an electrical heating element attached to said shoe in heat transfer relation therewith, means on the shoe for mounting it on a curved surface, a plurality of elongated flat heat reflector plates spaced close to said shoe and mounted above the shoe with air gaps between each of said plates, and means securing said heat plates to the shoe along their length and forcing the plates to bend with said shoe.

11. A heater for conditioning metal plates for welding comprising an elongated heater shoe formed of a bendable material having a bottom plate-engaging heat transfer surface, an electrical heating element attached to said shoe in heat transfer relation therewith, means on the shoe for mounting it on a curved surface, an elongated bendable heat reflector plate mounted above said shoe with an air gap between the shoe and the plate, and means mounting the plate above the shoe and bending the plate with the shoe as the shoe is bent to conform to the curvature of a metal plate to be welded.

12. A heater for conditioning metal plates for welding comprising an elongated heater shoe bendable along its length to conform to the curvature of an arcuate surface to be heated and having a bottom plate-engaging heat transfer surface, an electric heating element on said shoe in heat transfer relation therewith, an elongated bendable heat reflector plate above said shoe with an air gap between the heating element and the plate, and means supporting the plate on the shoe and bending the plate with the shoe as the shoe is bent to conform to the curvature of the surface to be heated.

13. A heater for conditioning metal plates for welding comprising an elongated heater shoe formed of a bendable material having a bottom plate-engaging heat transfer surface, an electrical heating element attached to said shoe in heat transfer relation therewith, means on the shoe for mounting it on a curved surface, an elongated bendable heat reflector plate mounted above said shoe with an air gap between the shoe and the plate, and spaced supporting means at spaced locations supporting the plate on the shoe and maintaining the air gap with bending of the shoe.

References Cited in the file of this patent

UNITED STATES PATENTS

| | | |
|---|---|---|
| 2,234,122 | Heck | Mar. 4, 1941 |
| 2,260,803 | Dewar | Oct. 28, 1941 |
| 2,668,896 | Husaczka et al. | Feb. 9, 1954 |
| 2,725,457 | Norton | Nov. 29, 1955 |
| 2,747,070 | Bargehr | May 22, 1956 |
| 2,842,654 | Anderson | July 8, 1958 |
| 2,875,312 | Norton | Feb. 24, 1959 |
| 2,877,332 | Senior | Mar. 10, 1959 |
| 2,882,376 | Charbonneau | Apr. 14, 1959 |

FOREIGN PATENTS

| | | |
|---|---|---|
| 597,696 | Great Britain | Feb. 2, 1948 |
| 720,939 | Great Britain | Dec. 29, 1954 |
| 794,270 | Great Britain | Apr. 30, 1958 |